L. A. HOFFMAN, Jr.
GAS SEPARATOR.
APPLICATION FILED JULY 20, 1911.
1,048,533.
Patented Dec. 31, 1912.
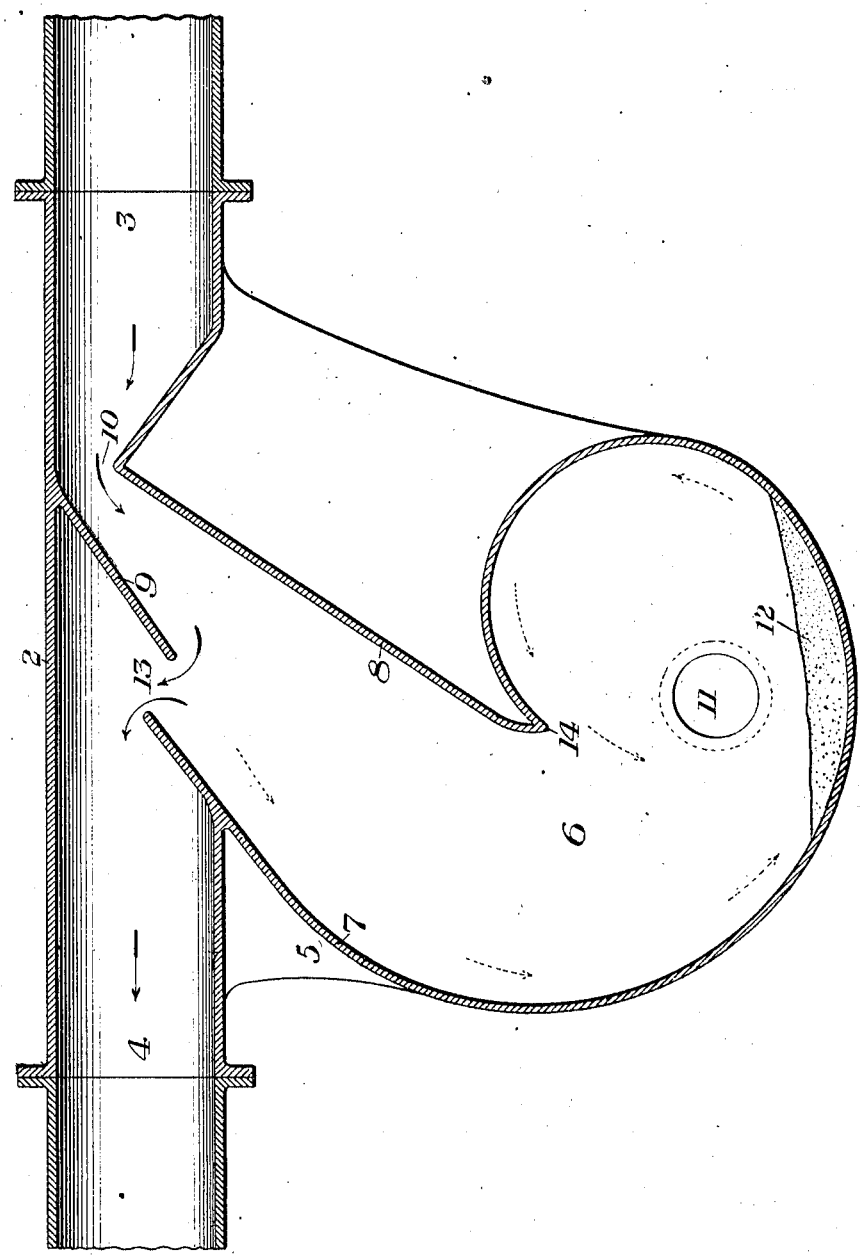

UNITED STATES PATENT OFFICE.

LOUIS A. HOFFMAN, JR., OF LEETONIA, OHIO.

GAS-SEPARATOR.

1,048,533.

Specification of Letters Patent. Patented Dec. 31, 1912.

Application filed July 20, 1911. Serial No. 639,645.

*To all whom it may concern:*

Be it known that I, LOUIS A. HOFFMAN, Jr., a resident of Leetonia, in the county of Columbiana and State of Ohio, have invented a new and useful Improvement in Gas-Separators, of which the following is a full, clear, and exact description, reference being had to the accompanying drawing, forming part of this specification, in which the figure is a longitudinal sectional view of the separator.

My invention relates to separators for gas or air and is designed to provide a cheap and efficient device of this character for separating heavy matter from the gas or air while passing therethrough, and in which the heavy matter is deflected out of the blanket of gas or air passing through the separator, and is deposited into a reservoir out of the path of the gas or air.

The precise nature of my invention will be best understood by reference to the accompanying drawing which will now be described, it being premised, however that various changes may be made in the details of the construction without departing from the spirit and scope of my invention as defined in the appended claims.

In the accompanying drawing, I have shown a longitudinal section through the separator, in which the numeral 2 designates the casing of the separator. This casing is provided with an inlet 3 for the gas or air to be cleaned, and an outlet 4 for the cleaned gas or air. The side walls 5 of the casing extend downwardly to form side walls of a reservoir 6, for the reception of the heavy matter which has been removed from the gas or air. Extending downwardly between the side walls 5 of the casing are walls 7 and 8; and extending downwardly from the top of the casing between these walls 7 and 8 is a deflector or baffle 9, the lower end of which extends below the upper end of the wall 7.

The inlet portion of the separator is contracted vertically as at 10, at a point adjacent to the upper end of the deflector 9, in order to cause the gas or air to pass this point in a relatively thin layer or blanket. The wall 7 extends downwardly and forwardly, thence downwardly and rearwardly, then upwardly and forwardly, and then downwardly, meeting the wall 8 at the lower end thereof. This wall 7 forms the end walls of the receptacle or reservoir 6, and is arranged to deflect the heavy matter in a spiral manner, so as to throw it downwardly and rearwardly to a point where the particles will be beyond the influence of the air or gases passing through the separator.

11 is a clean-out opening through one of the side walls 5, and is arranged to permit the removal of the material 12, which is deposited on the bottom of the reservoir.

The operation is as follows: The air or gas to be cleaned is admitted through the opening 3 and then passed through the contracted portion 10, where the velocity of the moving gas and contained particles is materially increased. The gas and particles held in suspension are thrown downwardly by means of the baffle 9. The gas passes out through the space 13, between the upper end of the wall 7 and lower end of the baffle 9, while the velocity given to the particles contained within the gas will throw them downwardly against the wall 7, and the helical form of this wall will throw the particles downwardly and rearwardly under the point 14, where the wall 7 meets the wall 8, at which point the particles will be out of the path of the gas moving through the separator. The full line arrows indicate the movement of the gas or air through the separator, and the dotted arrows indicate the movement of the heavy particles in the body of the reservoir.

The advantage of my invention results from the provision of a separator for gas or air in which the heavy particles held in suspension in the gas are thrown downwardly and rearwardly into a reservoir in front of the gas inlet to the separator, so as to place them at a point where they can not be picked up by the moving gas.

I claim:

1. A separator for removing heavy matter from gas or air, comprising a casing having an inlet and an outlet for the gas to be cleaned, an inclosed chamber having a rearwardly extending pocket formed by the walls of said casing for receiving the heavy matter, and an oblique deflector within said casing extending downwardly between the mouth of the inlet and the mouth of the outlet, one of the end walls of the casing being continuous and having a portion substantially parallel with the deflector for deflecting the heavy matter downwardly and rearwardly into said pocket out of the path of the gas; substantially as described.

2. A separator for removing the heavy matter from gas or air, comprising a casing having an inlet and an outlet for the gas to be cleaned, an inclosed chamber formed by the side and end walls of said casing for receiving the heavy matter, and a deflector within said casing extending at an acute angle downwardly between the mouth of the inlet and the mouth of the outlet, one of the end walls extending obliquely above the bottom of the deflector, and a rearwardly and forwardly extending curved wall forming a continuation of one of the end walls and connected to the lower end of the other end wall, the first mentioned end wall and the curved continuation thereof forming a second deflector for deflecting the heavy matter downwardly into the casing and out of the path of the gas; substantially as described.

3. A separator for removing heavy matter from gas or air, comprising a casing having an inlet and outlet for the gas to be cleaned, an inclosed chamber formed by the walls of said casing for receiving the heavy matter, and a deflector within said casing extending downwardly at an acute angle between the end walls of the casing and between the mouth of the inlet and the mouth of the outlet to the casing for deflecting the heavy matter downwardly into said chamber, the end wall of the casing at the side at which the outlet is located being approximately parallel with the deflector for a portion of its length, and a curved end wall connected to the last mentioned end wall and forming a continuation thereof, said curved wall being arranged to deflect the material downwardly and backwardly; substantially as described.

In testimony whereof, I have hereunto set my hand.

LOUIS A. HOFFMAN, Jr.

Witnesses:
B. F. HENNACY,
J. W. SASHDOLLOR.